Dec. 11, 1934.  M. D. FITZGERALD  1,983,746
GREASE EXCLUDING RING
Filed Jan. 17, 1934
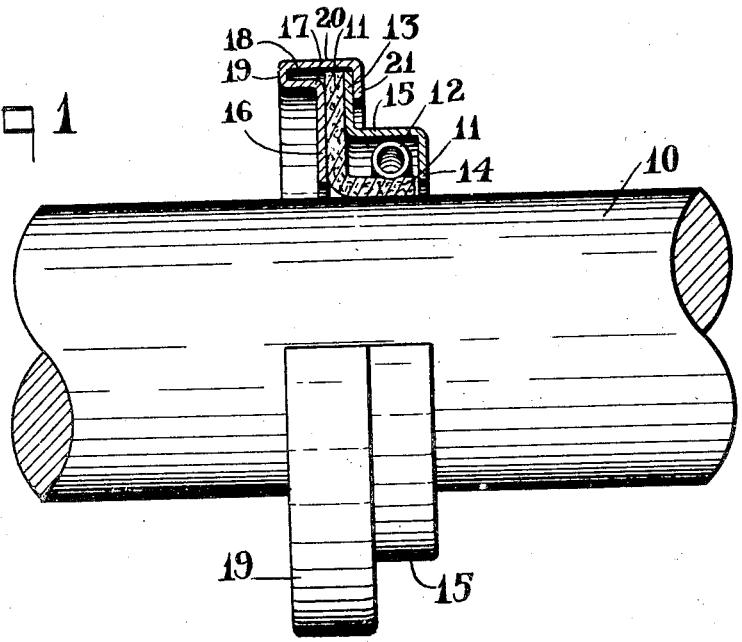
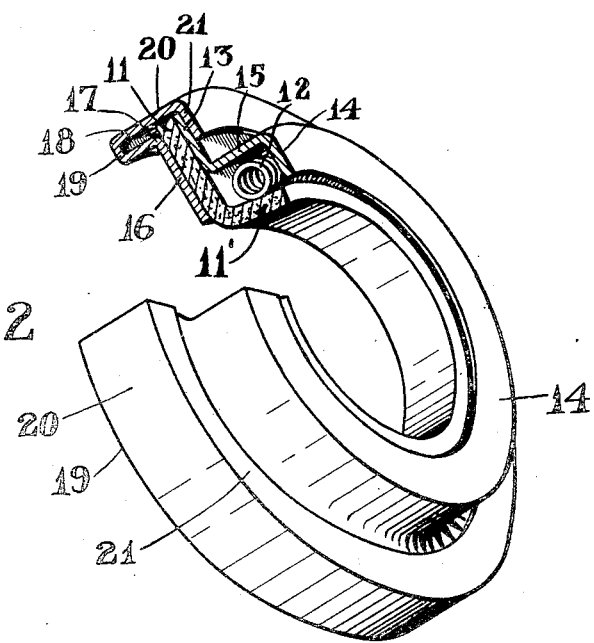
WITNESSES:
ALBaswell
Evelyn Baitzel
INVENTOR:
Martin D. Fitzgerald
BY Joshua R. H. Potts
ATTORNEY Patented Dec. 11, 1934

1,983,746

UNITED STATES PATENT OFFICE 1,983,746

GREASE EXCLUDING RING

Martin D. Fitzgerald, Torrington, Conn., assignor to The Fitzgerald Manufacturing Company, Torrington, Conn., a corporation of Connecticut Application January 17, 1934, Serial No. 706,956

2 Claims. (Cl. 288—1)

This invention relates to grease excluding rings, and has for an object to provide a ring of the type embodying new and improved features of economy and convenience of manufacture and reliability of action.

A further object of the invention is to provide such a ring having a cage of ample dimensions for enclosing the necessary parts with the minimum external expanse.

A further object of the invention is to provide an oil excluding ring having a flexible packing member with a helical tensioning member thereon and a chamber for said packing member and helical member provided in a new and improved manner.

The invention, therefore, comprises in combination a flexible packing member and helical spring, a cage enclosing said packing and spring, said cage comprising an ogee annulus and a second section having a return bend forming an external annular bead and with the edge peened over the ogee member to clamp the flexible packing member between a flange of the ogee member and the side wall of the companion member.

In the drawing,

Figure 1 is a view of the ring partly in side elevation and partly in diametrical section shown in association with a shaft, and Figure 2 is a perspective view of the oil excluding ring with a section cut therefrom on radial lines.

Like characters of reference indicate corresponding parts throughout the several views.

The oil excluding ring which forms the subject-matter of this application is adapted to be employed in conjunction with a rod or shaft 10, which may be a rotating shaft or a reciprocating shaft, or may be stationary and the ring may rotate or reciprocate relative thereto.

The ring as an entirety comprises a flexible packing member 11 which is formed substantially L-shaped having a relatively cylindrical part 11' which bears upon the shaft 10 and is held in intimate oil excluding contact therewith by helical spring 12 which entirely surrounds the cylindrical sleeve and exerts continual pressure thereon.

To maintain this flexible packing 11 and spring 12 in operative position, a cage is provided having two companion parts, one an ogee part having flanges 13 and 14 connected by a web 15. The web 15 is approximately cylindrical and the flanges 13 and 14 formed at the opposite ends of this cylinder, one extending outwardly, the other inwardly from said cylindrical part, are throughout the major part of their area approximately on parallel planes.

The other member of the cage comprises a substantially plane part 16 at its outer edge bent at 17 to form one side of a U-bend 18 which produces an external bead 19. The opposite side of the U-bend provides a substantially cylindrical part 20 which is peened over the outwardly extending flange 13 of the ogee member, as shown at 21.

It will be obvious to one skilled in the art that the plane member 16 and the flange 14 will be provided with central openings larger than and through which the shaft 10 extends, so that the sleeve 11' of the flexible packing will bear freely upon the surface of the shaft without the engagement therewith of the parts of the cage which, under the present practice, are composed of metal.

It is believed that the operation of the device will be fully and completely understood from the foregoing description of the structure and that further description thereof would be surplusage.

Of course, the oil excluding ring, herein illustrated, may be modified and changed in various ways without departing from the invention herein set forth and hereinafter claimed.

I claim:—

1. An oil excluding ring comprising a flexible packing member having an approximately cylindrical part and an annular part, a pair of annuli clamping the annular part therebetween, said cylindrical part extending through and beyond one annulus, and a return bend integral with the annuli forming a bead extending opposite from the cylindrical part and increasing the external bearing surface.

2. An oil excluding ring comprising a flexible packing member having an approximately cylindrical part and an annular part, a pair of annuli, an ogee member between the annuli and together with one annulus clamping the annular part therebetween, said cylindrical part extending through and beyond one annulus, and a return bend integral with the annuli forming a bead extending opposite from the cylindrical part and increasing the external bearing surface.

MARTIN D. FITZGERALD.